Patented Mar. 30, 1926.

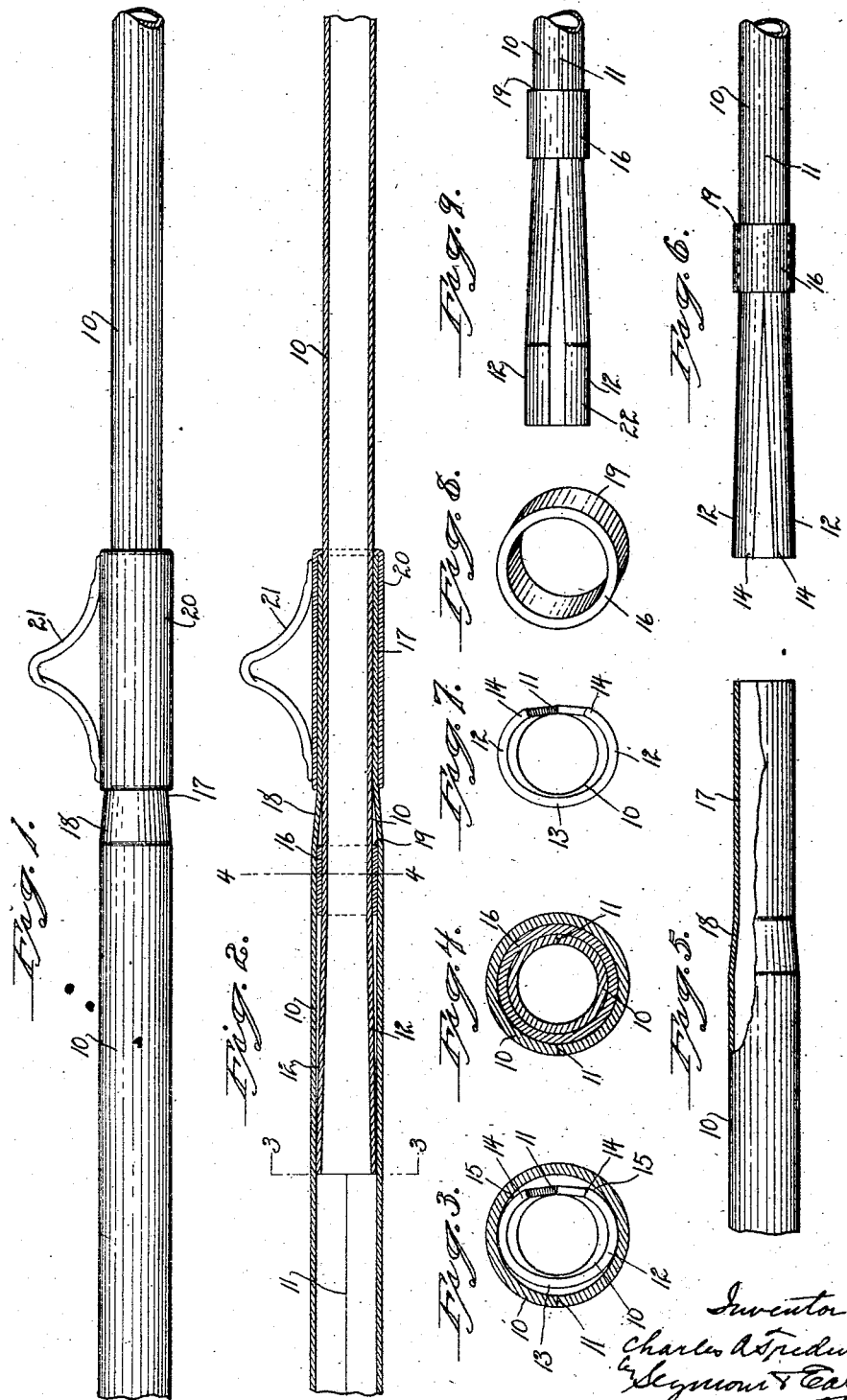

1,578,781

UNITED STATES PATENT OFFICE.

CHARLES A. TREDWELL, OF NEW HAVEN, CONNECTICUT, ASSIGNOR TO WINCHESTER REPEATING ARMS CO., OF NEW HAVEN, CONNECTICUT.

TELESCOPIC FISHING ROD.

Application filed October 14, 1924. Serial No. 743,527.

*To all whom it may concern:*

Be it known that I, CHARLES A. TREDWELL, a citizen of the United States, residing at New Haven, in the county of New Haven and State of Connecticut, have invented a new and useful Improvement in Telescopic Fishing Rods; and I do hereby declare the following, when taken in connection with the accompanying drawings and the characters of reference marked thereon, to be a full, clear, and exact description of the same, and which said drawings constitute part of this application, and represent, in—

Fig 1 a broken view, in side elevation, of a telescopic fishing-rod, constructed in accordance with my invention.

Fig. 2 a view thereof in central, longitudinal section.

Fig. 3 a view thereof, on a larger scale, in transverse section, on the line 3—3 of Fig. 2.

Fig. 4 a corresponding view on the line 4—4 of Fig. 2, on the same scale as Fig. 3.

Fig. 5 a broken view, partly in side elevation and partly in longitudinal section, of the upper end of one of the joint-sections of the rod.

Fig. 6 a broken view of the lower end of the complementary joint-section thereof.

Fig. 7 a view, in rear elevation, of the lower end of the joint section, as shown in Fig. 6.

Fig. 8 a perspective view of one of the guide-collars.

Fig. 9 a view corresponding to Fig. 6, but showing a modification thereof.

My invention relates to an improvement in telescopic fishing-rods, the object being to produce a rod having a cheap, simple and efficient construction for the production of the friction required to maintain its several joint-sections in their extended and telescoped relations.

With these ends in view, my invention consists in a telescopic fishing-rod characterized by cylindrical joint-sections having the lower end of each expanded conically on the line of the seam and thus enlarged in diameter, such expanded portion of the joint-section being slightly flattened on the seam for frictional engagement with the complementary joint-section in which it has telescopic movement, whereby the friction is removed from the corners at the end of the seam.

My invention further consists in a telescopic fishing-rod having certain details of construction as will be hereinafter described and pointed out in the claims.

In carrying out my invention, as herein shown, each joint-section 10 of the rod, barring the butt-section, has its seam 11 expanded at its lower end, as at 12, whereby the joint-section at said end is enlarged. The expanded lower end of the joint is then slightly flattened along the seam on each side thereof in the direction of the diameter which passes through the seam, as at 13, whereby the corners 14 of the metal are withdrawn from contact with the inner wall of the complementary joint-section, as shown at 15 in Fig. 3, and prevented from abrading or grooving such surfaces of the complementary joint-section, so as to rapidly decrease the friction hold between the joint-section. At the outer end of the expanded portion of each joint-section, I braze on a guide-collar 16, dimensioned to have an easy sliding fit in the complementary joint-section, so as to increase the guiding surface between the two joint-sections. To increase the guiding surface between any two complementary joint-sections, the upper end of each section is reduced in diameter for the production of a guiding-sleeve 17 having an easy sliding fit, as shown in Fig. 2, over the main portion of the complementary joint-section. The production of the sleeve 17 results in the formation of a cone 18 between the same and the main body of the joint-section. This cone co-operates with the outer end 19 of the guide-collar on the complementary section, so as to form a stop to prevent the separation of the sections, as shown in Fig. 2. A band 20 is brazed upon the sleeve 17 of each section for the carriage of the usual line-guide 21.

In the modification shown by Fig. 9, the joint-section 10, after the expansion of its seam 11 at its lower end, as at 12, is subjected to the action of suitable forming-tools, whereby a substantially cylindrical bearing-surface 22 is formed at the lower end of the section, so as to apply the friction over a surface, instead of upon a line of contact. Thus, in this modified form, the surface 22 makes contact throughout its length with the inner wall of the complementary section.

I claim:

1. In a telescopic fishing-rod, the combination with a longitudinally-seamed, cylindrical joint-section having its lower end conically expanded along its seam and slightly flattened on each side thereof, of a guide-collar fastened upon the said joint-section at the upper end of its said expanded and flattened portion; and a complementary joint-section in which the expanded and flattened lower end of the joint-section first mentioned has sliding bearing.

2. In a telescopic fishing-rod, the combination with a longitudinally-seamed, cylindrical joint-section having its lower end conically expanded along its seam and slightly flattened on each side thereof, of a guide-collar mounted upon the said joint-section at the upper end of its said expanded and flattened portion; and a complementary joint-section having its upper end reduced in diameter to form a guide-sleeve and a cone.

3. As a new article of manufacture, a longitudinally-seamed, tubular joint-section for use in the manufacture of telescopic fishing-rods, the said joint-section having a cylindrical main-body, and having its lower end conically expanded along its seam and shaped to form a substantially cylindrical friction-surface slightly flattened on each side of the seam.

In testimony whereof, I have signed this specification.

CHARLES A. TREDWELL.